(12) United States Patent
Paddick

(10) Patent No.: US 11,314,029 B2
(45) Date of Patent: Apr. 26, 2022

(54) MANAGEMENT SYSTEM FOR OPTICAL FIBERS

(71) Applicant: Prysmian S.p.A., Milan (IT)

(72) Inventor: Nathan Paddick, Milan (IT)

(73) Assignee: PRYSMIAN S.P.A., Milan (IT)

( * ) Notice: Subject to any disclaimer, the term of this patent is extended or adjusted under 35 U.S.C. 154(b) by 0 days.

(21) Appl. No.: 17/062,188

(22) Filed: Oct. 2, 2020

(65) Prior Publication Data
US 2021/0116664 A1    Apr. 22, 2021

(30) Foreign Application Priority Data

Oct. 17, 2019    (IT) .................... 102019000019139

(51) Int. Cl.
*G02B 6/44* (2006.01)
*G02B 6/38* (2006.01)

(52) U.S. Cl.
CPC ......... *G02B 6/4455* (2013.01); *G02B 6/3858* (2013.01); *G02B 6/445* (2013.01); *G02B 6/4452* (2013.01)

(58) Field of Classification Search
CPC ................................................. G02B 6/4455
See application file for complete search history.

(56) References Cited

U.S. PATENT DOCUMENTS

| 4,913,522 A | 4/1990 | Nolf et al. | |
| 6,496,640 B1 | 12/2002 | Harvey et al. | |
| 2008/0085094 A1* | 4/2008 | Krampotich | G02B 6/4455 385/135 |
| 2009/0185782 A1* | 7/2009 | Parikh | G02B 6/4446 385/135 |
| 2011/0211799 A1 | 9/2011 | Conner et al. | |
| 2012/0295486 A1 | 11/2012 | Petersen et al. | |

FOREIGN PATENT DOCUMENTS

| EP | 0367477 A2 * | 5/1990 | ........... G02B 6/4471 |
| JP | H09311228 A | 12/1997 | |
| WO | 9412904 A2 | 6/1994 | |
| WO | WO-2012034576 A1 * | 3/2012 | ........... G02B 6/4447 |

* cited by examiner

*Primary Examiner* — Charlie Y Peng
(74) *Attorney, Agent, or Firm* — Slater Matsil, LLP

(57) ABSTRACT

The present invention relates to an optical fibers management system comprising: a supporting frame; a plurality of splice trays pivotably mounted on the supporting frame and rotatable around respective parallel pivot axes between a closed position and an open position; a locking device pivotably mounted on the supporting frame and rotatable around a locking device rotation axis parallel to the pivot axes of the plurality of splice trays between a locking position and a support position, wherein in the locking position the locking device keeps the plurality of trays in the closed position, and in the support position the locking device supports the plurality of splice trays in the open position.

19 Claims, 4 Drawing Sheets

MANAGEMENT SYSTEM FOR OPTICAL FIBERS

CROSS-REFERENCE TO RELATED APPLICATIONS

This application claims the benefit of Italian Patent Application No. 102019000019139 filed on Oct. 17, 2019, which application is hereby incorporated herein by reference.

TECHNICAL FIELD

The present invention relates to a system for managing and distributing optical fibers.

BACKGROUND

Systems for management and distribution of optical fibers are known in the art. The optical fiber systems are used, for example, in joint closures, wall boxes, distribution cassettes, central office equipment as well as in optical fiber networks.

Generally, an optical fiber system comprises a plurality of splice trays for storing and splicing optical fibers together. Storage areas are provided upstream the splice area to store extra-length portions of the optical fibers which are actually used, so as to avoid for example that an installer error oblige the installer to deploy another entire new cable, as well as to store optical fibers which are not used. Typically, an optical fiber system further comprises routing elements, namely transportation tubes or routing channels, for suitably directing optical fibers, that may be grouped in fiber modules, which enter and exit the optical fiber system, towards the splice trays and away from the splice trays.

Examples of known optical fibers management systems are briefly discussed below.

JPH09311228A discloses an optical cable closure with which the execution of work, such as switching of connection, in a hot-line state is made possible by preventing the vibration of separated and turned trays. The optical fiber closure is constructed to prevent the vibrations of open trays relative to a connecting rod by pressing the open trays by means of hook-and-loop fasteners to a supporting bar and holding the open trays integrally with the connecting bar. The influence of the vibration acting on the coated optical fibers and optical connector is lessened. A support stand rotates around an axis perpendicular to the splice tray rotation axis. The support stand does not lock the splice trays when closed.

U.S. Pat. No. 6,496,640 discloses a splice closure containing multiple splice trays that can be individually pivoted and accessed so that the splice closure is capable of optimally carrying and providing access to numerous optical fibers and optical fiber splices. The splice closure has a housing defining an internal cavity and at least one opening to the internal cavity. An end cap is capable of occluding the opening of the housing to provide an enclosed configuration. A support frame has opposite front and rear ends, the front end of the support frame is connected to the end cap, and the support frame is capable of being positioned within the internal cavity of the housing during the enclosed configuration. The support frame extends in a longitudinal direction between the front and rear ends, and defines a frame axis that extends in the longitudinal direction. The multiple splice trays are pivotally carried by the support frame so that there are a plurality of axes of rotation that are generally parallel to the frame axis and about which the splice trays are respectively pivotable. Biasing mechanisms are operative for releasably holding the splice trays to the support frame. Fixed restricting flanges function as stops for restricting the pivoting of splice trays.

U.S. Pat. No. 4,913,522 discloses an enclosure for a butt splice of optical fiber cables which includes organizer trays for storing the excess lengths of individual optical fibers. The enclosure and trays provide for access to the individual fibers for splicing or repair. An apparatus stand may be used for working on a closure joint. The apparatus comprises a movable support that is used to maintain slice trays in an open position. The support is a separate part not present in the closure joint.

WO 94/12904 A2 describes a fiber optic splice closure including a series of stacked splice trays pivotally secured within a housing. The splice trays are pivotally secured at one end to a bracket secured to an end cap of the housing. A hinge for each splice tray includes detents to hold an individual tray in a raised position to thereby facilitate access to an underlying tray.

SUMMARY

In one embodiment, an optical fibers management system includes a supporting frame, a plurality of splice trays pivotably mounted on the supporting frame and rotatable around respective parallel pivot axes between a closed position and an open position. The system includes a locking device pivotably mounted on the supporting frame and rotatable around a locking device rotation axis parallel to the pivot axes of the plurality of splice trays between a locking position and a support position, wherein, in the locking position, the locking device keeps the plurality of splice trays in the closed position, and in the support position the locking device supports the plurality of splice trays in the open position.

BRIEF DESCRIPTION OF THE DRAWINGS

Further characteristics and advantages will be more apparent from the following description of some embodiments given as a way of an example with reference to the enclosed drawings in which.

DETAILED DESCRIPTION OF ILLUSTRATIVE EMBODIMENTS

For the purpose of the present description and of the appended claims, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

The present disclosure, in at least one of the aforementioned aspects, can be implemented according to one or more of the following embodiments, optionally combined together.

For the purpose of the present description and of the appended claims, the words "a" or "an" should be read to include one or at least one and the singular also includes the plural unless it is obvious that it is meant otherwise. This is done merely for convenience and to give a general sense of the disclosure.

The Applicant has observed that large splice trays may become heavy such that they may suddenly fall down during installation or maintenance work.

Embodiments of this application advantageously provide a management system for optical fibers suitable to support large splice trays configured to firmly hold the splice trays in position, so to avoid that the splice trays fall during installation or maintenance work.

Embodiments of this application disclose an optical fibers management system comprising a supporting frame; one or more splice trays pivotably mounted on the supporting frame and rotatable around respective parallel pivot axes between a closed position and an open position; a locking device pivotably mounted on the supporting frame and rotatable around a locking device rotation axis parallel to the pivot axes of the one or more splice trays between a locking position and a support position, wherein in the locking position the locking device keeps the one or more splice trays in the closed position, and in the support position the locking device supports the one or more splice trays in the open position.

The locking device firmly keeps the splice trays in the closed position even if they are large and heavy. Additionally, the locking device supports the splice trays in the open position, thereby rendering the operations easy for an installer working on the management system.

FIGS. 1-4 illustrate a management system 1 for optical fibers according to an embodiment of the invention. The management system 1 can be used, for example, in joint closures, wall boxes, distribution cassettes, central office equipment as well as in optical fiber networks. Particularly, the management system of the embodiment illustrated in the Figures can be used as a joint closure.

The optical fiber management system 1 comprises a supporting frame 2 and one or more, preferably a plurality of, splice trays 3 (three splice trays in the Figures).

Figure 1:
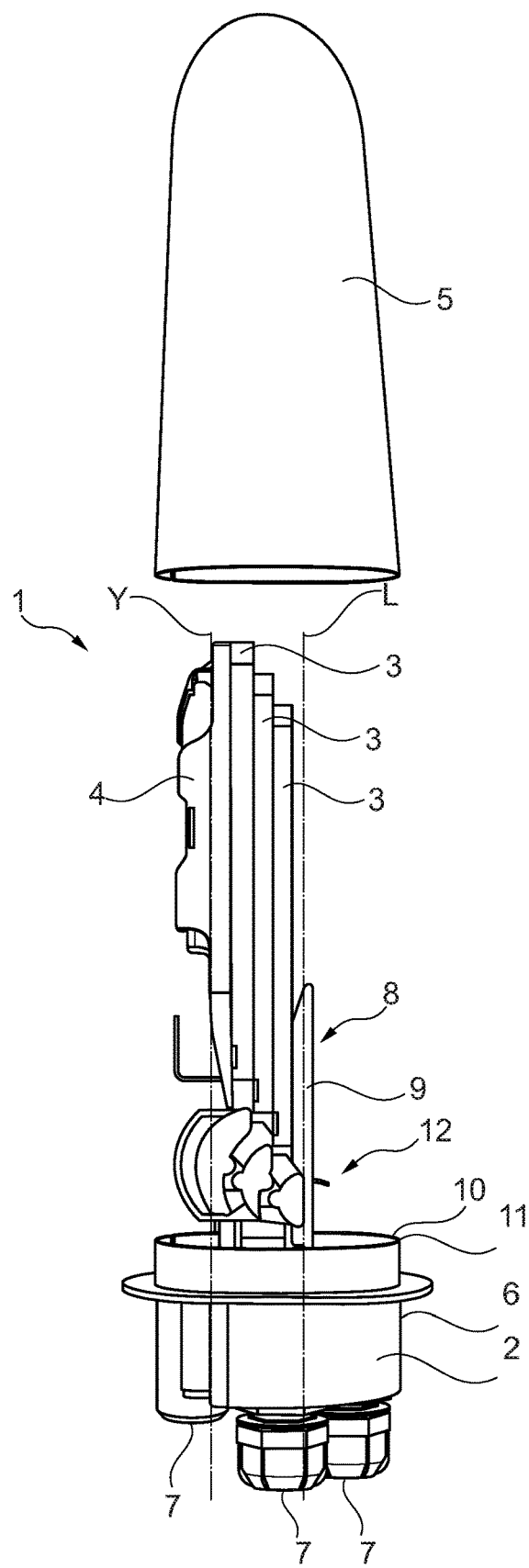
FIG. 1 is a partially-exploded side view of an optical fibers management system according to an embodiment of the disclosure in a first configuration.
Figure 2:
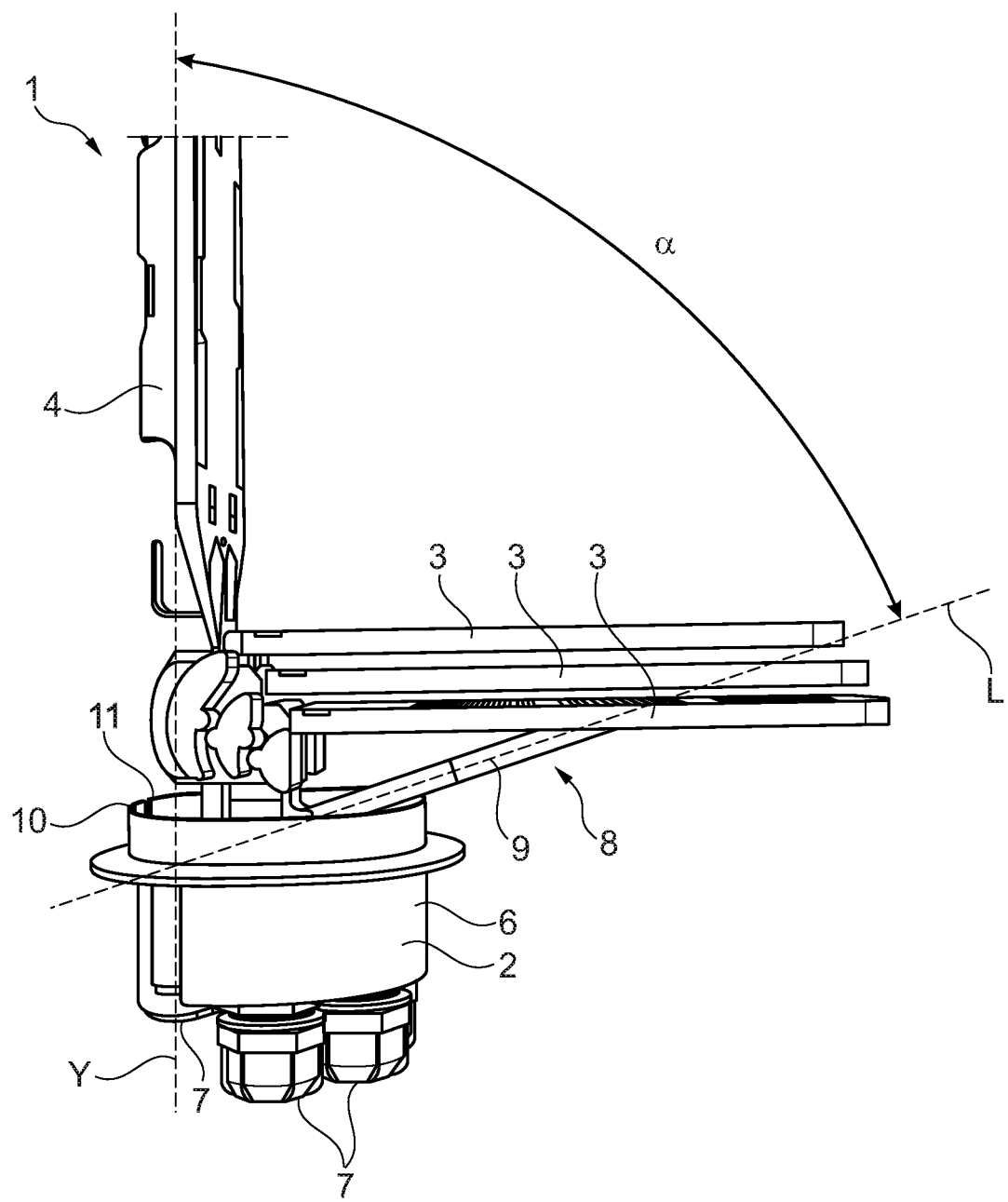
FIG. 2 is a side view of the optical fibers management system in FIG. 1 in a second configuration according to an embodiment of the disclosure.
Figure 3:
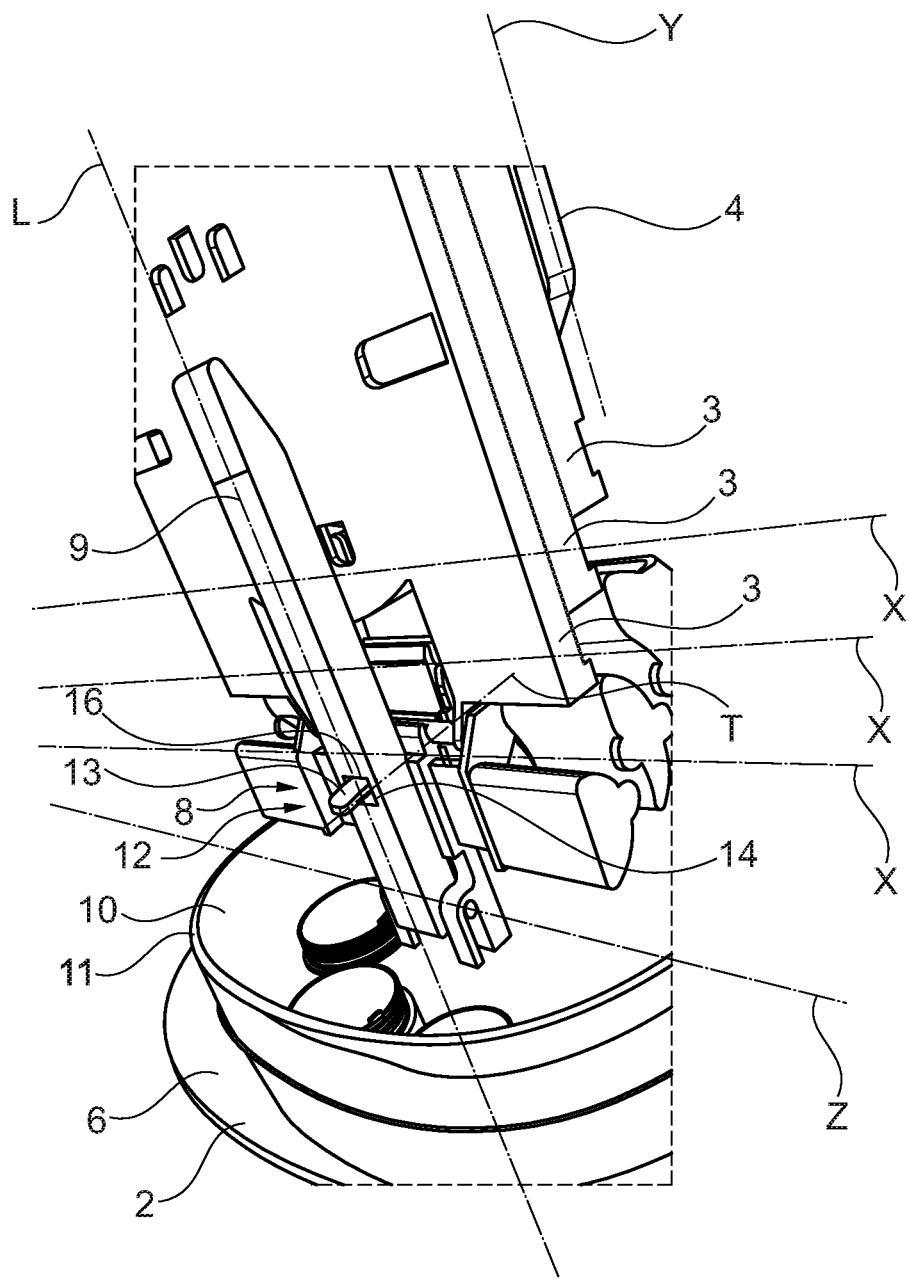
FIG. 3 is a perspective view of a detail of the fibers management system in FIG. 1 according to an embodiment of the disclosure.
Figure 4:
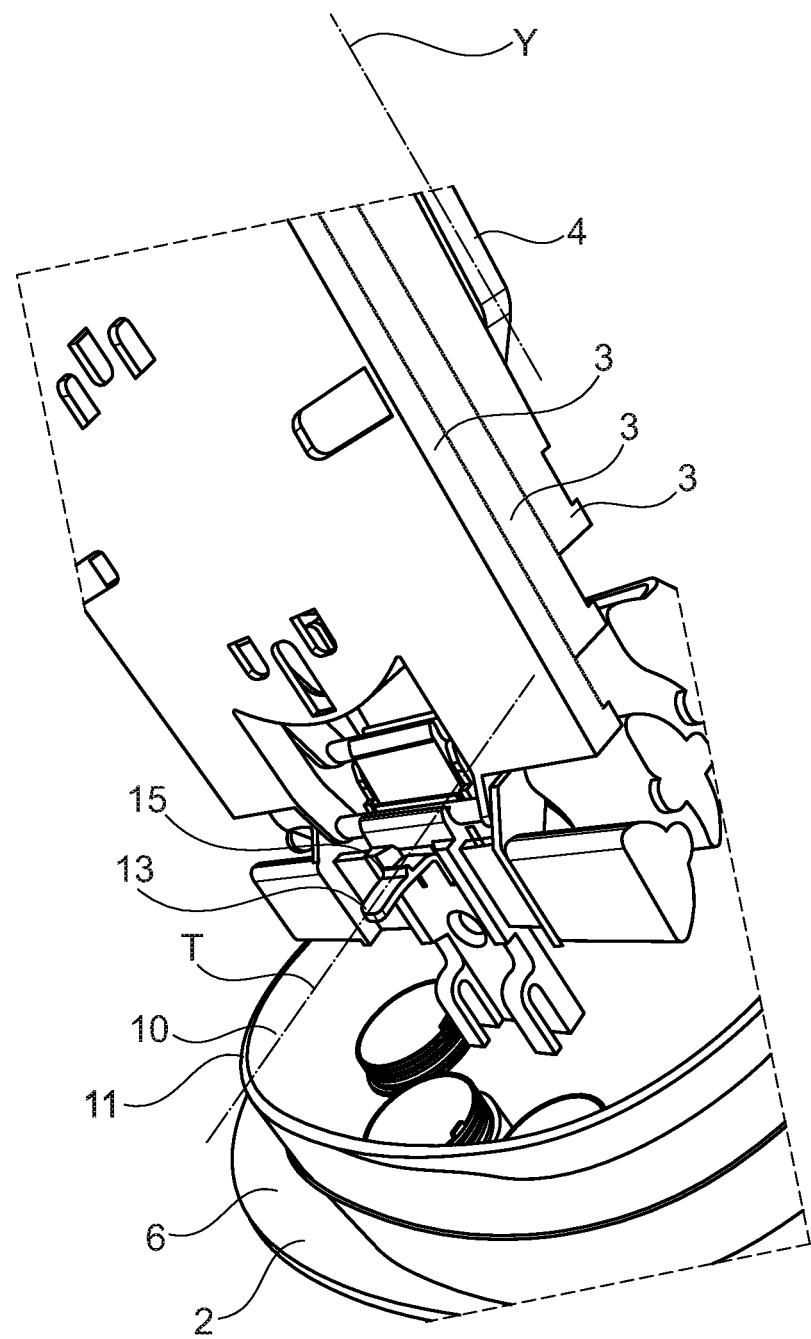
FIG. 4 is a perspective view of the detail of the fibers management system in FIG. 3 where a locking stand is not shown according to an embodiment of the disclosure.

The splice trays 3 are pivotably mounted on the supporting frame 2 around respective pivot axes X parallel each other. Particularly, the splice trays 3 are pivotable between a closed position (as shown in FIG. 1) and an open position (as shown in FIG. 2). The closed position corresponds to a working position of the management system 1, whereas the open position is for the maintenance of the same, for example for the access of an operator to the splice trays 3.

The splice trays 3 are preferably substantially plate-formed and, still more preferably, superimposed in a stack, and lie in respective parallel planes in both the open and the closed positions. In the closed position, the above-mentioned planes defined by the stack of splice trays 3 preferably extend parallel to an axis Y of main development of the supporting frame 2, which preferably corresponds to a longitudinal development direction of the system 1. Particularly, the supporting frame 2 can comprise a fixed support 4 extending parallel to the axis Y, i.e. having a main longitudinal development direction corresponding to the axis Y. The fixed support preferably comprises a flat portion facing the splice trays 3. In the closed position, the stack of splice trays 3 extends parallel to the fixed support 4, whereas in the open position the stack of splice trays 3 extends transversally, preferably orthogonally, with respect to the axis Y and the fixed support 4. According to an embodiment, the rotation axes X are in turn transversal, preferably, orthogonal, with respect to the axis Y.

All the splice trays 3 in the stack can be individually and sequentially flipped down (i.e. moved from the closed position to the open position) so that any of the splice trays 3 can be accessed. This allow an installer, who is requested to route and splice an optical fiber within the system 1, to easily access the desired splice tray by flipping down the splice trays 3 which are positioned above the desired splice tray. At the end of the operation which has been carried out by the installer on the desired splice tray, the latter can be flipped up (i.e. moved from the open position to the closed position) again so that all the splice trays lie in substantially parallel planes.

According to an embodiment, the system 1 comprises a removable cover 5 adapted to be removable connected to the supporting frame 2, particularly to a base 6 thereof. The removable cover 5 defines an internal housing where the stack of splice trays 3 can be housed when in the closed position. The cover 5 should be removed when it is necessary to move the splice trays 3 in the open position. The base 6 comprises inlets/outlets 7 for cables comprising optical fibers that may be arranged in modules. The optical fibers and/or modules are arranged on the splice trays 3. Typically, an incoming fiber module comprises 2, 4, 8, 16 or 32 optical fibers so that up to 32 customers can be supplied from only one incoming fiber module.

The system 1 comprises a locking device 8 pivotably coupled to the supporting frame 2, particularly to the base 6. The locking device 8 can rotate around a rotation axis Z parallel to the pivot axes X of the splice trays 3 with respect to the supporting frame 2, and is movable between a locking position and a support position. In the locking position (FIG. 1), the locking device 8 keeps the splice trays 3 in the closed position, particularly sandwiched between the fixed support 4 and the locking device 8 itself. In the support position (FIG. 2), the locking device 8 supports the splice trays 3 in the open position.

According to an embodiment, the locking device 8 comprises a locking stand 9 hinged to the supporting frame 2 so as to rotate around the Z axis. The locking stand 9 preferably mainly extends along a longitudinal axis L. Preferably, in the locking position, the locking stand 9 is oriented such that the longitudinal axis L is parallel to the axis Y (FIG. 1), whereas, in the support position, the locking stand 9 is oriented such that the longitudinal axis L is transversal to the axis Y, preferably forming an angle α lower than 90° (FIG. 2).

In the locking position, the locking stand 9 is positioned such that the superimposed splice trays 3 are kept in the closed position between the fixed support 4 and the locking stand 9 itself (FIG. 1). In the support position, the locking stand 9 is positioned so to support the top splice trays 3 of the slack (i.e. the splice tray opposite to the fixed support 4) in the open position and, additionally, one or more of the other splice trays 3 when they are in the open position (FIG. 2).

According to an embodiment, the supporting frame 2 is configured so to support for gravity the locking device 8, particularly the locking stand 9, in the support position. To this purpose, the supporting frame 2, particularly the base 6, can comprise a supporting portion 10, which, for example, can comprise a circumferential rim 11.

The system 1, advantageously, comprises a holding device 12 configured for releasably maintain the locking device 8 in the locking position. According to an embodiment, the holding device 12 comprises an elastic tongue 13 associated to the supporting frame 2 configured to engage the locking stand 9 when it is in the locking position and to maintain it in the latter. When it is desired to move the locking stand 9 to the support position, the elastic tongue 13 can be elastically deformed, preferably in a manual manner, such that it disengages the locking stand 9 which is so released and, as a consequence, free to be moved towards the support position.

Preferably, the elastic tongue 13 develops along an axis T transversal, preferably perpendicular, to a plane formed by the locking device rotation axis Z and the longitudinal axis L when the locking stand 9 is in the locking position. According to an embodiment, the locking stand 9 comprises a transversal through hole 14 where the elastic tongue 13 can be inserted so as to be at least partially protruding from the latter when the locking stand 9 is in the locking position. An engaging portion 15 of the elastic tongue 13 engages an edge 16 of the window defined by the through hole 14 so to engage the locking stand 9 in the locking position. When the elastic tongue 13 is elastically deformed, the engaging portion 15 disengages the edge 16 so that the locking stand 9 can be moved towards the support position and, at the same time, the elastic tongue 13 is extracted from the through hole 14. When the locking stand 9 is moved again in the locking position, it interferes with the engaging portion 15 of the tongue 13, which is consequently deformed during the insertion in the through hole 14 until the engaging portion engages again the edge 16, thereby locking again the locking stand 9 in the locking configuration. Advantageously, the engaging portion 15 is configured so to act as a wedge when the tongue is inserted into the through hole 14 of the locking stand 9 and the engaging portion 15 interacts with the edge 16 of the window defined by the through hole 14. As a consequence of this wedge effect, the tongue 13 elastically deforms, as discussed above.

What is claimed is:

1. An optical fibers management system comprising:
   a supporting frame comprising a fixed support;
   a plurality of splice trays pivotably mounted on the supporting frame and rotatable around respective parallel pivot axes between a closed position and an open position; and
   a locking device pivotably mounted on the supporting frame and rotatable around a locking device rotation axis parallel to the pivot axes of the plurality of splice trays between a locking position and a support position, wherein, in the locking position, the locking device keeps the plurality of splice trays in the closed position, and in the support position the locking device supports the plurality of splice trays in the open position, wherein the locking device comprises a locking stand mainly extending longitudinally along a longitudinal axis and hinged to the supporting frame so as to rotate around the locking device rotation axis, and wherein when the locking stand is in the locking position, the plurality of splice trays is sandwiched in the closed position between the fixed support and the locking stand.

2. The optical fibers management system according to claim 1, wherein the fixed support extends parallel to a system main development axis, wherein, in the closed position, the plurality of splice trays extends parallel to the system main development axis, and in the open position the plurality of splice trays extends transversally with respect to the system main development axis.

3. The optical fibers management system according to claim 1, wherein the fixed support extends parallel to a system main development axis, wherein, in the closed position, the plurality of splice trays extends parallel to the system main development axis, and wherein, in the open position, the plurality of splice trays extends transversally with respect to the system main development axis.

4. The optical fibers management system according to claim 1, wherein in the support position the locking stand is positioned so to support the plurality of splice trays in the open position.

5. The optical fibers management system according to claim 1, wherein the fixed support extends parallel to a system main development axis, wherein in the closed position the plurality of splice trays extends parallel to the system main development axis, and in the open position the plurality of splice trays extends transversally with respect to the system main development axis, and wherein in the locking position the locking stand is oriented such that its longitudinal axis is parallel to the system main development axis, and in the support position the locking stand is oriented such that its longitudinal axis is transversal to the system main development axis.

6. The optical fibers management system according to claim 1, wherein the supporting frame comprises a fixed support extends parallel to a system main development axis, wherein in the closed position the plurality of splice trays extends parallel to the system main development axis, and in the open position the plurality of splice trays extends transversally with respect to the system main development axis, and wherein in the support position the locking stand is oriented such that its longitudinal axis forms an angle lower than 90° with the system main development axis.

7. The optical fibers management system according to claim 1, wherein the supporting frame supports for gravity the locking device in the support position.

8. An optical fibers management system comprising:
   a supporting frame comprising a fixed support;
   a plurality of splice trays pivotably mounted on the supporting frame and rotatable around respective parallel pivot axes between a closed position and an open position;
   a locking device pivotably mounted on the supporting frame and rotatable around a locking device rotation axis parallel to the pivot axes of the plurality of splice trays between a locking position and a support position, wherein, in the locking position, the locking device keeps the plurality of splice trays in the closed position, and in the support position the locking device supports the plurality of splice trays in the open position, wherein the locking device comprises a locking stand mainly extending longitudinally along a longitudinal axis and hinged to the supporting frame so as to rotate around the locking device rotation axis, and wherein when the locking stand is in the locking position, the plurality of splice trays is sandwiched in the closed position between the fixed support and the locking stand; and
   a holding device configured for releasably maintain the locking device in the locking position.

9. The optical fibers management system according to claim 8, wherein the locking device comprises a locking stand mainly extending longitudinally along a longitudinal axis and hinged to the supporting frame so to rotate around the around the locking device rotation axis, and wherein the holding device comprises an elastic tongue associated to the supporting frame configured to engage the locking stand when it is in the locking position, the elastic tongue being elastically deformable such that, when it is elastically deformed, it releases the locking stand such that it can be moved towards the support position.

10. The optical fibers management system according to claim 9, wherein the elastic tongue develops along a tongue axis transversal to a plane formed by the locking device rotation axis and the locking stand longitudinal axis when the locking stand is in the locking position, wherein the locking stand comprises a transversal through hole where the elastic tongue is inserted, and wherein a portion of the elastic tongue protrudes from the transversal through hole when the locking stand is kept in the locking position by the elastic tongue.

11. The optical fibers management system according to claim 10, wherein the elastic tongue comprises an engaging portion configured for engaging an edge of a window defined by the transversal through hole in the locking stand when the locking stand is in the locking position.

12. An optical fibers management system comprising:
a supporting frame;
inlets/outlets for cables comprising optical fibers;
a plurality of splice trays pivotably mounted on the supporting frame and rotatable around respective parallel pivot axes between a closed position and an open position, the plurality of splice trays configured to hold the cables;
a removable cover configured to be removably connected to the supporting frame, the removable cover defining an internal housing that houses plurality of splice trays when in the closed position; and
a locking device mounted on the supporting frame and operable between a locking position and a support position by being rotatable around a locking device rotation axis parallel to the pivot axes, wherein, in the locking position, the locking device is configured to hold the plurality of splice trays in the closed position, and in the support position the locking device is configured to hold the plurality of splice trays in the open position, wherein the locking device comprises a locking stand oriented along a longitudinal axis and hinged to the supporting frame so as to rotate around the locking device rotation axis, and wherein when the locking stand is in the locking position, the plurality of splice trays is sandwiched in the closed position between a fixed support and the locking stand, the fixed support being part of the supporting frame.

13. The optical fibers management system according to claim 12, wherein the fixed support extends parallel to a system main development axis, wherein, in the closed position, the plurality of splice trays extends parallel to the system main development axis, and in the open position the plurality of splice trays extends at an angle with respect to the system main development axis.

14. The optical fibers management system according to claim 12, wherein the fixed support extending parallel to a system main development axis, and wherein in the support position the locking stand is positioned so to support the plurality of splice trays in the open position.

15. The optical fibers management system according to claim 12, wherein, in the support position, the locking stand is oriented such that its longitudinal axis forms an angle lower than 90° with a system main development axis, and wherein, in the closed position, the plurality of splice trays extends parallel to the system main development axis.

16. The optical fibers management system according to claim 12, further comprising a holding device configured for releasably maintain the locking device in the locking position.

17. The optical fibers management system according to claim 16, wherein the holding device comprises an elastic tongue associated to the supporting frame configured to engage the locking stand when it is in the locking position, the elastic tongue being elastically deformable such that, when it is elastically deformed, it releases the locking stand such that it can be moved towards the support position.

18. The optical fibers management system according to claim 17, wherein the elastic tongue develops along a tongue axis transversal to a plane formed by the locking device rotation axis and the locking stand longitudinal axis when the locking stand is in the locking position, wherein the locking stand comprises a transversal through hole where the elastic tongue is inserted, and wherein a portion of the elastic tongue protrudes from the transversal through hole when the locking stand is kept in the locking position by the elastic tongue.

19. The optical fibers management system according to claim 18, wherein the elastic tongue comprises an engaging portion configured for engaging an edge of a window defined by the transversal through hole in the locking stand when the locking stand is in the locking position.

* * * * *